N. C. Moore,
Street Sprinkler.
No. 110,775.   Patented Jan. 3, 1871.
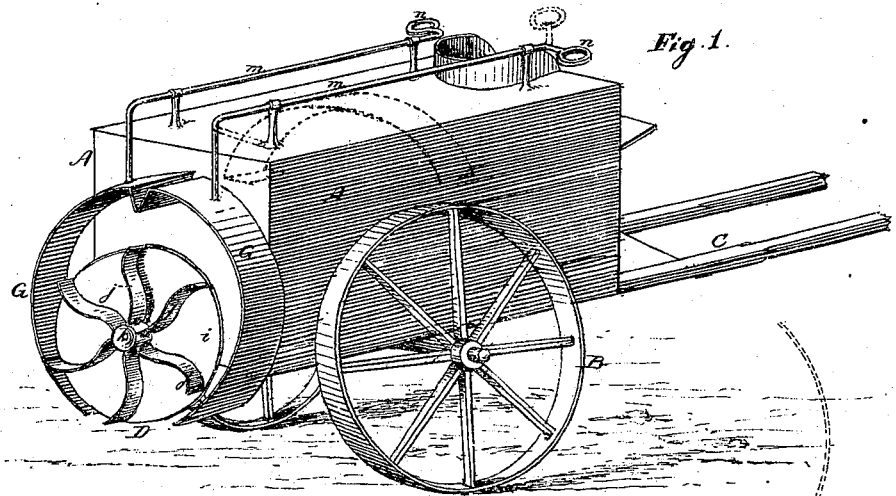
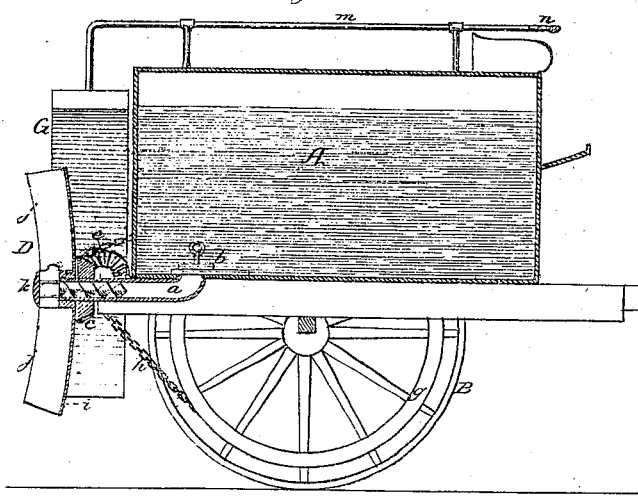
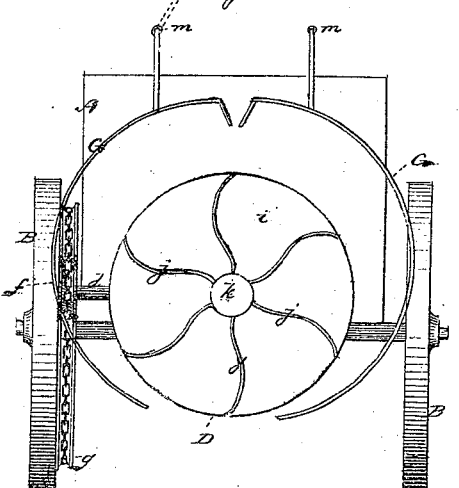
Witnesses:
Phil. T. Dodge
Harry King
Inventor:
Wm. G. Moore
by Dodge & Munn
his Attys.

United States Patent Office.

WILLIAM C. MOORES, OF WASHINGTON, DISTRICT OF COLUMBIA, ASSIGNOR OF TWO-THIRDS OF HIS RIGHT TO GILBERT PULLEN, OF SAME PLACE.

Letters Patent No. 110,775, dated January 3, 1871.

IMPROVEMENT IN STREET-SPRINKLERS.

The Schedule referred to in these Letters Patent and making part of the same.

*To all whom it may concern:*

Be it known that I, WILLIAM C. MOORES, of Washington, in the county of Washington and District of Columbia, have invented certain Improvements in Street-Sprinklers, of which the following is a specification, reference being had to the accompanying drawing.

My invention relates to a machine for sprinkling streets, shrubbery, &c., with water, and consists in a tank mounted on wheels and provided with a revolving head of peculiar construction for scattering the water, and with mechanism for driving said head, as hereinafter described.

Figure 1 is a perspective view of my machine complete;

Figure 2, a longitudinal vertical section through the middle of the same; and

Figure 3, a rear end elevation of the machine.

In the drawing—

A represents the tank or body, mounted upon two wheels, B, and provided at one end with shafts or thills C for attaching a horse.

To the bottom of the tank, near the rear end, is attached a tube, a, which extends horizontally out behind the tank, as shown in fig. 2.

An opening is made in the top of the tank for the introduction of the water, and a valve, b, is arranged in the bottom over the mouth of tube a for the purpose of regulating or shutting off the flow of water through said tube, an operating cord or handle being, of course, extended from said valve up within reach of the driver.

On the extreme outer end of the tube a a circular head or scatterer, D, is mounted, so as to turn loosely thereon; and, to the rear side of this head, loosely around the tube, a bevel-pinion, c, is secured, as shown in fig. 2.

Transversely on the rear end of the machine is mounted a shaft, d, having on its inner end a bevel-wheel, e, which gears into the pinion c of the head D, and on its outer end a grooved pulley, f, as shown in figs. 2 and 3.

On the inner side of one of the main wheels B is secured a grooved wheel, g, and around this wheel and the pulley f of shaft d a band or chain, h, is passed, as shown in figs. 2 and 3.

As the machine is drawn forward the wheel g, turning with the main wheel, will, through the belt h, operate the pulley f, and thereby the shaft d and pinion e, and the latter will turn or revolve the head D with great rapidity.

The head D consists of a circular disk, i, having secured to its face a series of radial blades, j, each of which extends from the periphery of the disk into near the center of the same, close to the open end of tube a.

Against the outer edge of the blades, opposite the open end of tube b, is secured a small disk, k, against the front or inner face of which the water issuing from tube b impinges.

The head D being set in motion, and the valve b opened, the water flows down through tube a, and, striking against disk k, reacts, and is taken up by the blades j and thrown outward in the form of fine spray.

The disk i may, if desired, be made concave on its rear face, and the blades j may have any longitudinal curve found best.

On top, and lengthwise of the body, is mounted two sliding rock-shafts, m, one on each side, each of which has a handle or arm, n, at the front end.

To the rear end of each of these shafts is attached a curved metal plate or shield, G, as shown in figs. 1, 2, and 3.

By sliding the shafts m lengthwise, either or both of the shields may be moved forward opposite the side of the head D, so as to shut off or intercept the shower of spray; or, by turning the shafts by means of their arms n, either or both of the shields may be turned up any desired distance, so as to limit the width of space sprinkled.

It will be seen that by means of these shields the shower of water may be limited or shut off when passing near the footwalk or to carriages, or like places or things.

A driver's seat may also be placed on the upper front end of the body, as shown. Instead of two, the machine, when of a large size, may be provided with four wheels.

Small machines may be constructed on my plan, and provided with a handle, so as to be trundled by hand.

A machine of this construction will be found very useful for gardeners, florists, and farmers, for sprinkling beds, flowers, shrubbery, &c.

Having thus described my invention,

What I claim is—

1. A street-sprinkler, consisting of the tank or body A and a distributing-wheel or head, D, connected thereto, and arranged to be operated by the movement of the apparatus, substantially as described.

2. The disk i, provided with the radial blades j, constituting the head D, and the bevel-pinion c mounted on the tube a, in combination with the shaft d having the bevel-pinion e and pulley f, arranged to be operated by the driving-wheel B, substantially as set forth.

3. In combination with the head or distributer D the shields G, constructed and arranged to operate substantially as herein described.

WM. C. MOORES.

Witnesses:
PHIL. T. DODGE,
W. C. DODGE.